United States Patent

Farnsworth et al.

[15] 3,668,435

[45] June 6, 1972

[54] EFFICIENCY PULSE FORMING NETWORK CHARGING SYSTEMS

[72] Inventors: Robert P. Farnsworth, Los Angeles; Rodney J. Dahlinger, Canoga Park, both of Calif.

[73] Assignee: Hughes Aircraft Company, Culver City, Calif.

[22] Filed: Aug. 12, 1970

[21] Appl. No.: 63,042

[52] U.S. Cl. ..............................307/260, 307/270, 307/275, 307/282, 328/65, 328/67

[51] Int. Cl. ..........................................................H03k 5/00

[58] Field of Search..................307/246, 260, 270, 275, 282, 307/314, 315; 328/65, 67; 330/17, 26; 331/112, 149

[56] References Cited

UNITED STATES PATENTS

| | | | |
|---|---|---|---|
| 2,810,080 | 10/1957 | Trousdale | 307/260 |
| 2,972,061 | 2/1961 | Mueller | 307/275 X |
| 2,989,651 | 6/1961 | Smith | 307/275 |
| 2,999,172 | 9/1961 | Lawrence, Jr. | 307/275 X |
| 3,072,802 | 1/1963 | Myers et al. | 307/270 X |
| 2,964,651 | 12/1960 | Thomas | 307/275 X |
| 3,219,844 | 11/1965 | Martin | 307/260 X |
| 2,949,543 | 8/1960 | Nordahl et al. | 307/315 X |
| 3,043,965 | 7/1962 | Scarbrough et al. | 330/26 X |
| 3,200,261 | 8/1965 | Fischman et al. | 307/265 X |

*Primary Examiner*—Stanley D. Miller, Jr.
*Attorney*—James K. Haskell and Walter J. Adam

[57] ABSTRACT

A current feedback switch for the charging supply of a pulse forming network (PFN) is provided with regenerative feedback through a transformer $T_2$ and a control transistor $Q_2$ in order that base current be more efficiently provided to drive a main switching transistor $Q_1$ to saturation. Turning-off the main switching transistor $Q_1$ is facilitated by the transistor $Q_2$ in series with the feedback transformer $T_2$. In that manner current is more efficiently turned on and off to charge the PFN.

6 Claims, 1 Drawing Figure

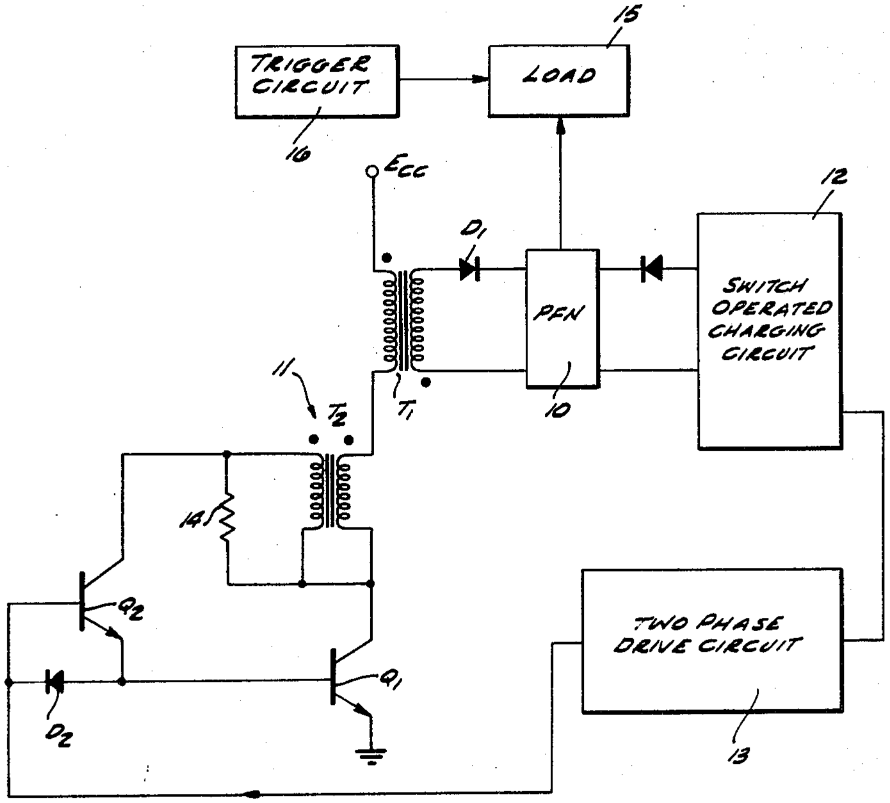
INVENTORS.
ROBERT P. FARNSWORTH,
ROD J. DAHLINGER,
BY
J K Haskell
ATTORNEY.

EFFICIENCY PULSE FORMING NETWORK CHARGING SYSTEMS

BACKGROUND OF THE INVENTION

This invention relates to high powered transistor switching circuits, and more particularly, to circuits for charging pulse forming networks.

Pulse forming networks (PFN's) are commonly used in high power pulse systems, such as radar and laser systems. A PFN is first charged from a DC source and then rapidly discharged into a load. For economy of power, an efficient circuit for charging the PFN is required.

The most efficient technique previously known for charging a PFN employs a transformer with a series switch in its primary winding. The switch is closed until current in the primary reaches a preset level or for a fixed length of time. Current flow in the secondary winding is blocked by a properly poled diode while the switch is closed. The switch is then opened and voltages across the transformer windings reverse as the magnetic field collapses. The reversed voltage in the secondary forward biases the diode to deliver current to the load.

The efficiency of such a prior art technique is fairly high because of the switching mode of operation. However, there is still significant loss of power in the operation of the switch when a transistor is used owing to its requirement for base drive current, and to its emitter-to-collector voltage when not operated in a saturated mode. To provide a more efficient transistor switch, a pair of transistors may be connected in the Darlington configuration with the collectors electrically integral, the base of one connected directly to the emitter of the other, and individual connections to the remaining emitter and base. The pair constitutes an equivalent single transistor having emitter and collector functions substantially equal to those of one of the transistors, but with the advantage of a higher current multiplication factor. However, the main switching transistor, i.e., the transistor having its base connected to the emitter of the other, does not totally saturate so that the actual voltage drop across the pair is typically greater than twice that of a saturated single transistor.

Another disadvantage of using either a single transistor or a pair of transistors in the Darlington configuration is that if the input voltage to the switch driving circuit increases, the base current drive increases, causing a substantial overdrive. To avoid losses associated with over drive, it would be necessary to regulate the power supply of the drive circuit, and that would require additional circuits which could consume more power than is being saved.

SUMMARY OF THE INVENTION

An object of this invention is to provide an efficient, high powered, transistor switching circuit.

Another object of this invention is to reduce losses in a transistor switch of a charging circuit for a pulse forming network.

Another object is to provide efficient means for saturating a transistor switch of a charging circuit for a pulse forming network without excessive over drive.

Still another object is to provide efficient means for saturating a transistor switch of a charging circuit for a pulse forming network which is not dependent upon input voltage to a drive circuit.

These and other objects of the invention are achieved by connecting a non-saturating regenerative feedback transformer having a primary winding in series with a PFN charging circuit in the collector circuit of a switching transistor and a secondary winding in series with a base current circuit of the switching transistor. In a preferred embodiment, the base current circuit comprises a second transistor having its emitter connected directly to the base of the first (switching) transistor and its collector connected to the collector of the first transistor through the secondary winding of the feedback transformer.

The novel features that are considered characteristic of this invention are set forth with particularity in the appended claims. The invention will best be understood from the following description when read in connection with the accompanying drawings.

BRIEF DESCRIPTION OF THE DRAWINGS

The sole FIGURE illustrates a circuit diagram of a preferred embodiment of the present invention.

DESCRIPTION OF THE PREFERRED EMBODIMENT

Referring to the drawing, a pulse forming network 10 alternately receives a charge from a switch operated charging circuit designated generally by the reference numeral 11 and an identical second circuit represented by a functional block 12. A two-phase drive circuit 13 turns the two charging circuits on alternately by out of phase positive pulses generated in a conventional manner, such as by a two-phase, square-wave generator.

Since both of the circuits 11 and 12 are identical, only the circuit 11 will be described. A non-saturating load transformer $T_1$ is connected to the PFN 10 by a diode $D_1$ poled for forward conduction only when current in the primary winding has been cut off by a main switching transistor $Q_1$. A non-saturating current feedback transformer $T_2$ is connected with its primary winding in series with the primary winding of the transformer $T_1$. The secondary winding of the transformer $T_2$ is then connected to the base of the transistor $Q_1$ to provide a positive feedback through a control switch comprising a transistor $Q_2$.

It should be noted that the control switch may be either a series switch, as shown, or a shunt switch. The series switch is preferred because the base current to the transistor $Q_2$ from the drive circuit 13 provides the initial base current to turn the main switching transistor $Q_1$ on. To that extent the pair of transistors $Q_1$ and $Q_2$ resemble a Darlington pair. It should also be noted that the secondary winding of the transformer $T_2$ may be connected across the base-emitter junction of transistor $Q_1$ by a series switch, instead of across the collector-base junction, but the latter is preferred because the former arrangement suffers from a shunting effect (due to the relatively low resistance of the secondary winding) until regeneration occurs.

In the preferred arrangement shown, the full current gain of the transistor $Q_2$ is available to turn the main switching transistor $Q_1$ on initially. The regenerative feedback current then drives the transistor $Q_1$ into saturation. The feedback transformer $T_2$ is designed such that the secondary to primary turns ratio is greater than the worst case saturated $\beta$ of the switching transistor $Q_1$ (typically 10). Current feedback through the transistor $Q_2$ into the base of transistor $Q_1$ will then be sufficient to guarantee saturation of the transistor $Q_1$ regardless of how much base-emitter voltage is required for the transistor $Q_1$.

While the main switching transistor $Q_1$ is conducting, the supply voltage $E_{cc}$ is applied across the primary winding of the transformer $T_1$. Due to the regenerative feedback, the transistor $Q_1$ is quickly driven into saturation so that virtually no power is lost in the transistor $Q_1$. The secondary current of transformer $T_1$ is zero due to the back biased diode $D_1$. The current builds up in the primary winding of the transformer $T_1$, either until a predetermined maximum level is reached or for a fixed length of time, depending upon whether the period of the drive circuit 13 is set to be greater or less than that required to reach the predetermined maximum level. Assuming that period is sufficiently long, when the maximum level is reached, current will still not flow in the secondary winding because the positive charge being stored in the PFN (which in its simplest form comprises one large storage capacitor) back biases the diode $D_1$.

When the transistor $Q_2$ is turned off by the drive circuit 13, the base current of the transistor $Q_1$ is cut off. The main switching transistor $Q_1$ is then quickly turned off (opened). Once current through the transistors $Q_1$ and $Q_2$ is cut off, a forward biasing voltage appears at the anode of the diode $D_1$ due to the inductive nature of the transformer $T_1$. In that manner charge current is delivered to the PFN 10. A diode $O_2$ protects the base-emitter junction against excessive turn-off (negative) voltage from the drive circuit 13 and a resistor 14 limits the reverse voltage on the secondary winding of the transformer $T_2$ when the transistors $Q_1$ and $Q_2$ are cut off. A diode may be used instead to shunt reverse voltage induced across the secondary winding of the transformer $T_2$ when the transistor $Q_1$ is turned off.

The charging cycle of the circuit 11 just described is alternated with the charging cycle of the circuit 12. In that manner one circuit is storing energy is its load transformer $T_1$, while the other is transferring stored energy from its load transformer $T_1$ to the storage capacitor or capacitors of the PFN 10.

In a typical application, such as a laser, the energy stored in the PFN 10 is discharged into a load 15, such as a flash lamp, which requires high energy for a very short period. The frequency of the discharge established by a trigger circuit 16 is, of course, significantly less than the frequency of the drive circuit 13 in order to allow the switches 11 and 12 to build up the stored energy to the level required. The efficiency with which that is accomplished is improved by the present invention, typically by as much as 5 to 10 percent. Another advantage is that both turn-on and turn-off of the main switch by the drive circuit is facilitated by the presence of the control transistor $Q_2$ in the path of the regenerative current. In that regard, it should be noted that regenerative current provided by the transformer $T_2$ is increased as the current level through the transistor $Q_1$ increases to the predetermined maximum level, but is independent of supply voltage. Therefore, when it is time to turn the transistors $Q_1$ and $Q_2$ off, very little demand is placed on the drive circuit since limited over-drive has been effected. The net result is easier control of the turn-off operation as well as the turn-on operation.

What is claimed is:

1. Apparatus comprising:

a source of power;

a first junction transistor of a given conductivity type having a base, an emitter and a collector;

a first transformer having its primary winding connected in series with said source of power and the collector of said first transistor;

means for connecting the emitter of said first transistor to said source of power for conduction of current through the primary winding of said first transformer, and the collector and emitter of said first transistor when current is applied to the base of said first transistor to forward bias a junction between the base and emitter of said first transistor;

a second junction transistor of the same conductivity type as said first transistor and having a base, an emitter and a collector;

means for directly connecting the emitter of said second transistor to the base of said first transistor;

means for selectively applying current to the base of said second transistor to forward bias a junction between the base and emitter of said second transistor; and a regenerative feedback transformer having its primary winding in series with the primary winding of said first transformer and the collector of said first transistor and having its secondary winding connected between the collector of said first transistor and the collector of said second transistor, thereby increasing the bias potential of said second transistor between the collector and emitter thereof when said first transistor conducts current through the primary winding of said regenerative transformer, thus allowing the first transistor to saturate and said second transistor to provide drive current through the base of said first transistor in relation to the collector current conducted by said first transistor.

2. Apparatus as defined in claim 1 wherein said regenerative feedback transformer is a non-saturating transformer.

3. A transistor switching circuit comprising first and second transistors of the same conductivity type, each having a base, an emitter and a collector, a transformer having a primary winding and a secondary winding, said first transistor having its emitter connnected to circuit ground and its collector connected in series with a source of power through said primary winding, and said second transistor having its emitter connected directly to said base of said first transistor and its collector connected to said collector of said first transistor through said secondary winding, the sense of said seconary winding being selected to provide regenerative feedback of drive current through said collector and emitter of said second transistor, and means for controlling drive current to said base of said second transistor for switching said first transistor on to saturation and off.

4. A transistor switching circuit as defined in claim 3 including a resistor connected between terminals of said secondary winding.

5. A transistor switching circuit as defined in claim 4 including a diode connected between said base and said emitter of said second transistor and poled for forward conduction when said second transistor is turned off by base drive current applied thereto of a particular polarity.

6. A transistor switching circuit as defined in claim 5 including a high powered load in series with said primary winding.

* * * * *